US012745199B2

(12) United States Patent
Cho et al.

(10) Patent No.: US 12,745,199 B2
(45) Date of Patent: Sep. 22, 2026

(54) TECHNIQUES FOR ON-DEMAND SYNCHRONIZATION SIGNAL BLOCK CONFIGURATION AND TRIGGER FOR SECONDARY CELL ACTIVATION

(71) Applicant: QUALCOMM Incorporated, San Diego, CA (US)

(72) Inventors: Hyunwoo Cho, San Diego, CA (US); Hung Dinh Ly, San Diego, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 18/613,900

(22) Filed: Mar. 22, 2024

(65) Prior Publication Data

US 2025/0301429 A1 Sep. 25, 2025

(51) Int. Cl.

*H04W 56/00* (2009.01)
*H04W 24/10* (2009.01)
*H04W 52/52* (2009.01)

(52) U.S. Cl.

CPC ....... *H04W 56/0015* (2013.01); *H04W 24/10* (2013.01); *H04W 52/52* (2013.01)

(58) Field of Classification Search

CPC ............... H04W 24/10; H04W 56/001; H04W 56/0015; H04W 80/02

See application file for complete search history.

(56) References Cited

U.S. PATENT DOCUMENTS

| | | | | |
|---|---|---|---|---|
| 2023/0337033 | A1* | 10/2023 | Hu | H04L 5/0048 |
| 2025/0063475 | A1* | 2/2025 | Si | H04W 48/14 |
| 2025/0267601 | A1* | 8/2025 | Si | H04W 56/0015 |
| 2025/0301407 | A1* | 9/2025 | Hu | H04W 52/0229 |

OTHER PUBLICATIONS

63532816_Specification (Year: 2023).*
63553854_Specification (Year: 2024).*

* cited by examiner

*Primary Examiner* — Rushil P. Sampat
(74) *Attorney, Agent, or Firm* — Harrity & Harrity LLP/ QUALCOMM Incorporated

(57) ABSTRACT

Various aspects of the present disclosure generally relate to wireless communication. In some aspects, a user equipment (UE) may identify a pattern for an on-demand synchronization signal block (SSB), wherein identifying the pattern is in association with a secondary cell activation. The UE may receive the on-demand SSB in accordance with the pattern. The UE may activate a secondary cell in accordance with the on-demand SSB. Numerous other aspects are described.

20 Claims, 11 Drawing Sheets

900

TECHNIQUES FOR ON-DEMAND SYNCHRONIZATION SIGNAL BLOCK CONFIGURATION AND TRIGGER FOR SECONDARY CELL ACTIVATION

FIELD OF THE DISCLOSURE

Aspects of the present disclosure generally relate to wireless communication and specifically relate to techniques, apparatuses, and methods for on-demand synchronization signal block configuration and trigger for secondary cell activation.

DESCRIPTION OF RELATED ART

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some aspects, a method of wireless communication performed by a user equipment (UE) includes identifying a pattern for an on-demand synchronization signal block (SSB), wherein identifying the pattern is in association with a secondary cell activation; receiving the on-demand SSB in accordance with the pattern; and activating a secondary cell in accordance with the on-demand SSB.

In some aspects, a method of wireless communication performed by a network node includes identifying a pattern for an on-demand SSB, wherein identifying the pattern is in association with a secondary cell activation; transmitting the on-demand SSB in accordance with the pattern; and activating a secondary cell in accordance with the on-demand SSB.

In some aspects, an apparatus for wireless communication at a UE includes one or more memories; and one or more processors, coupled to the one or more memories, configured to cause the UE to: identify a pattern for an on-demand SSB, wherein identifying the pattern is in association with a secondary cell activation; receive the on-demand SSB in accordance with the pattern; and activate a secondary cell in accordance with the on-demand SSB.

In some aspects, an apparatus for wireless communication at a network node includes one or more memories; and one or more processors, coupled to the one or more memories, configured to cause the network node to: identify a pattern for an on-demand SSB, wherein identifying the pattern is in association with a secondary cell activation; transmit the on-demand SSB in accordance with the pattern; and activate a secondary cell in accordance with the on-demand SSB.

In some aspects, a non-transitory computer-readable medium storing a set of instructions for wireless communication includes one or more instructions that, when executed by one or more processors of a UE, cause the UE to: identify a pattern for an on-demand SSB, wherein identifying the pattern is in association with a secondary cell activation; receive the on-demand SSB in accordance with the pattern; and activate a secondary cell in accordance with the on-demand SSB.

In some aspects, a non-transitory computer-readable medium storing a set of instructions for wireless communication includes one or more instructions that, when executed by one or more processors of a network node, cause the network node to: identify a pattern for an on-demand SSB, wherein identifying the pattern is in association with a secondary cell activation; transmit the on-demand SSB in accordance with the pattern; and activate a secondary cell in accordance with the on-demand SSB.

In some aspects, an apparatus for wireless communication includes means for identifying a pattern for an on-demand SSB, wherein identifying the pattern is in association with a secondary cell activation; means for receiving the on-demand SSB in accordance with the pattern; and means for activating a secondary cell in accordance with the on-demand SSB.

In some aspects, an apparatus for wireless communication includes means for identifying a pattern for an on-demand SSB, wherein identifying the pattern is in association with a secondary cell activation; means for transmitting the on-demand SSB in accordance with the pattern; and means for activating a secondary cell in accordance with the on-demand SSB.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
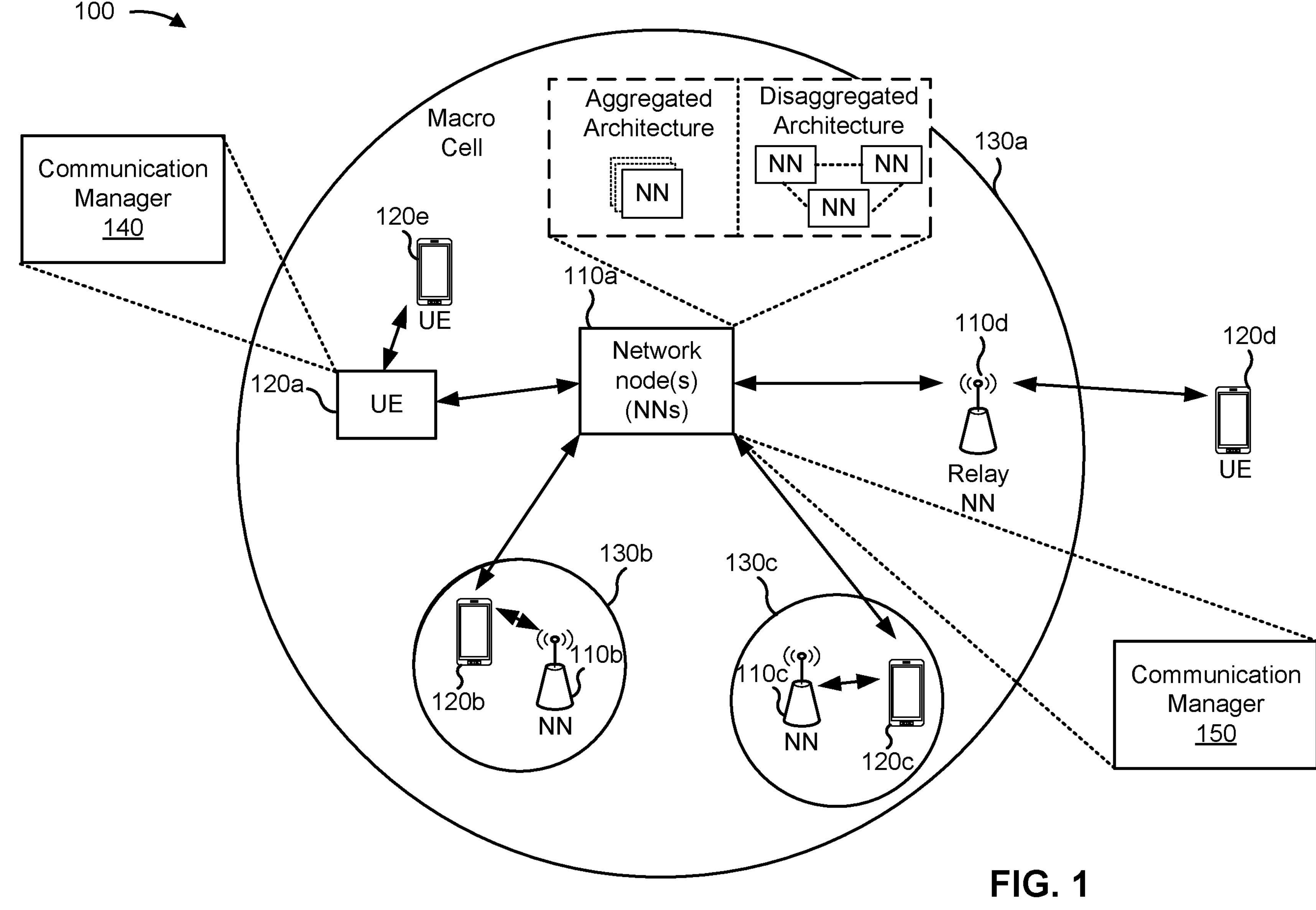
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A network node of a wireless communication system may transmit reference signals for various purposes. For example, the network node may transmit a synchronization signal block (SSB) that includes a set of reference signals and other information. An SSB may include, for example, a primary synchronization signal (PSS), a secondary synchronization signal (SSS), and a physical broadcast channel (PBCH). The SSB may be used for various purposes in a wireless network, such as synchronization (time and/or frequency synchronization), cell discovery, initial access, beamforming, and handover. In some examples, an SSB may be used for addition, removal, or management of a secondary cell for a UE, such as for SCell time and/or frequency synchronization, SCell activation signaling, SCell deactivation signaling, and/or Layer 1 (L1) or Layer 3 (L3) measurements.

An SSB may be transmitted in SS bursts and/or SS burst sets according to a periodicity. For example, an SSB may be transmitted in accordance with a periodicity of 5 milliseconds (ms), 10 ms, 20 ms, 40 ms, 80 ms, 160 ms, or the like. The periodicity of such an SSB may be indicated via system information, such as a system information block (SIB). Thus, the periodicity and transmission occasions of this SSB may tend to be consistent over time, unless the periodicity is changed via system information.

In some examples, a wireless communication network may implement an on-demand SSB. An on-demand SSB may include an SSB which can be transmitted in a triggered or situational fashion. For example, an on-demand SSB may be triggered by a network node in a particular scenario (such as SCell time/frequency synchronization, L1/L3 measurements, SCell activation, or the like), and the network node may provide an indication to a UE to expect or receive the on-demand SSB. As another example, a UE may provide an indication to a network node to trigger an on-demand SSB transmission. An on-demand SSB may differ from the periodic SSB described above in that the on-demand SSB can be triggered in a particular scenario, whereas a cell may be expected to periodically transmit SSBs unless semi-statically indicated otherwise (such as via system information). In some aspects, an on-demand SSB may be implemented in conjunction with (e.g., transmitted by the same network node as) non-on-demand SSBs. In such examples, the non-on-demand SSBs can be transmitted according to an increased periodicity such as 320 ms, 640 ms, or the like, which may not be permitted in network implementations that do not use an on-demand SSB. For example, a non-on-demand SSB may include a cell-defined SSB. In some aspects, an on-demand SSB may be transmitted as part of an SS burst. The on-demand SSB may facilitate reduced latency or delay in performing certain network measurements or functions (such as carrier aggregation (CA) setup, dual connectivity (DC) setup, or activation of CA or DC) relative to waiting for one or more non-on-demand SSBs to be received at the UE.

As mentioned, an on-demand SSB may be helpful for SCell activation purposes. SCell activation may be triggered by an SCell activation command indicating an SCell to be activated. The UE may perform measurements on SSBs in association with activating the SCell, and may provide a channel state information (CSI) report regarding the SCell. Additionally, or alternatively, the UE may provide a measurement report, which may facilitate selection or configuration of the SCell. However, if the UE and the network node do not both have information indicating arrival times, periodicities, quantities, and other parameters of the on-demand SSBs, on-demand SSB measurement and reporting may be unpredictable with regard to time. This may mean that a UE does not finish measurement of the on-demand SSBs during an activation period of the SCell, leading to delays in SCell activation.

Aspects of the present disclosure relate generally to SCell activation using on-demand SSBs. Some aspects more specifically relate to identifying a pattern for an on-demand SSB in association with a secondary cell activation. In some examples, a network node may transmit an indication of the pattern to a UE, and the network node and the UE may activate a secondary cell in accordance with an on-demand SSB that is transmitted and received according to the pattern. In some other examples, the UE may transmit an indication of the pattern to the network node. In some aspects, the pattern may be selected from one or more configured patterns. In some aspects, the UE may receive (e.g., measure, synchronize with) the on-demand SSB prior to receiving a secondary cell activation command. In some other aspects, the UE may receive the on-demand SSB after receiving the secondary cell activation command, such as during an activation time associated with the secondary cell activation command.

Particular aspects of the subject matter described in this disclosure can be implemented to realize one or more of the following potential advantages. In some examples, by identifying the pattern for the on-demand SSB in association with the secondary cell activation, the described techniques can be used to improve efficiency of secondary cell activation by providing a common understanding of the on-demand SSB's pattern. In some examples, by signaling the pattern for the on-demand SSB to the UE, the described techniques can be used to configure a pattern selected by the network node, which may account for channel conditions or a resource allocation at the network node. In some examples, by signaling the pattern to the network node, the described techniques can be used to provide for UE selection or requesting of the pattern, which provides flexibility for UEs having different capabilities or different levels or accuracies of synchronization to request an appropriate pattern. In some examples, by receiving the on-demand SSB prior to the secondary cell activation command, the described techniques can be used to reduce a length of time associated with secondary cell activation. In some examples, by receiving the on-demand SSB during an activation time, the described techniques can be used to provide the indication of the pattern with the secondary cell activation command, thereby reducing overhead.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may identify a pattern for an on-demand SSB, wherein identifying the pattern is in association with a secondary cell activation; receive the on-demand SSB in accordance with the pattern; and activate a secondary cell in accordance with the on-demand SSB. Additionally, or alternatively, the communication manager 140 may perform one or more other operations described herein.

In some aspects, the network node 110 may include a communication manager 150. As described in more detail elsewhere herein, the communication manager 150 may identify a pattern for an on-demand SSB, wherein identifying the pattern is in association with a secondary cell activation; transmit the on-demand SSB in accordance with the pattern; and activate a secondary cell in accordance with the on-demand SSB. Additionally, or alternatively, the communication manager 150 may perform one or more other operations described herein.

As indicated above, FIG. 1 is provided as an example. Other examples may differ from what is described with regard to FIG. 1.

Figure 2:
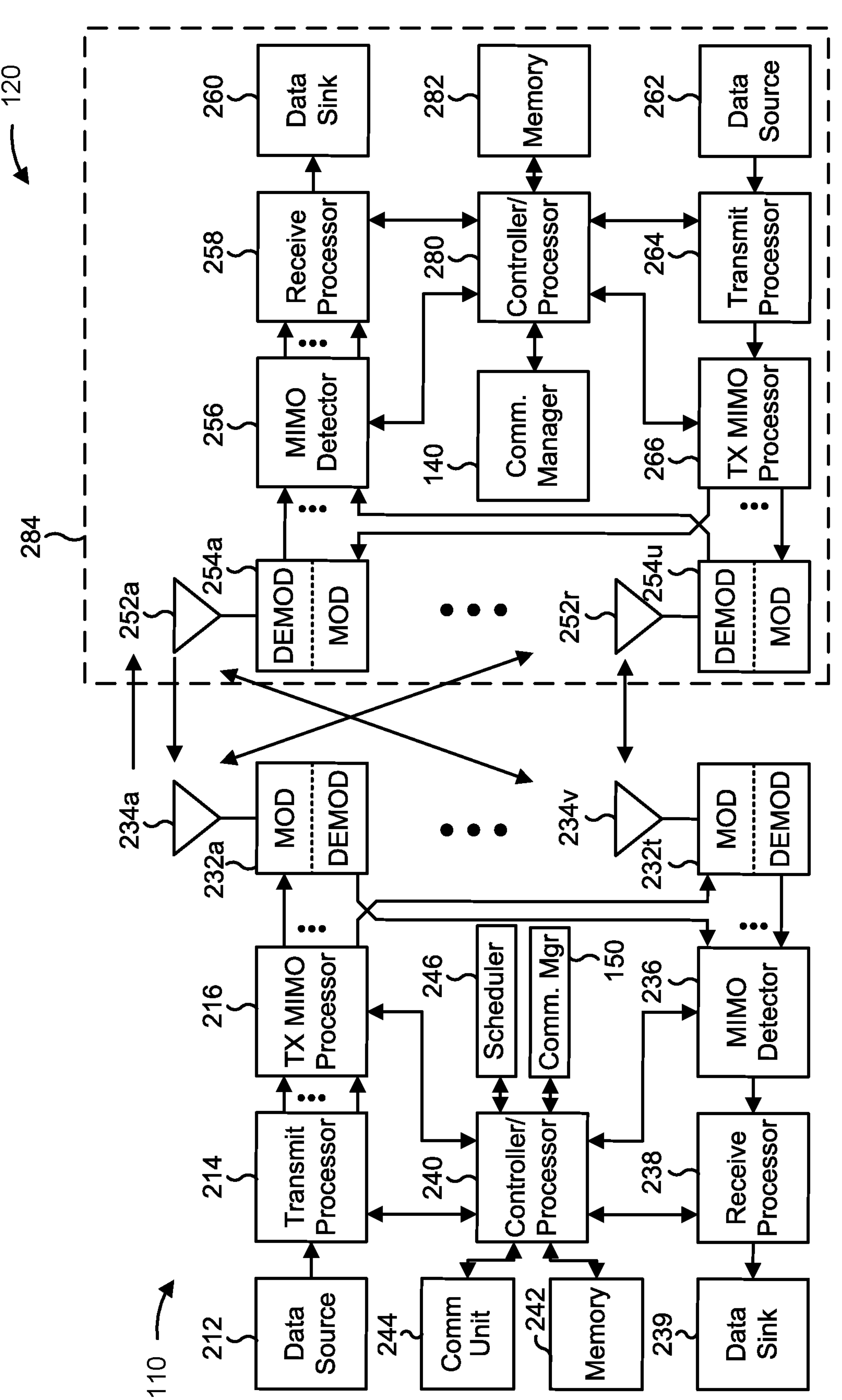
FIG. 2 is a diagram illustrating an example network node in communication with an example UE in a wireless network.

FIG. 2 is a diagram illustrating an example network node 110 in communication with an example UE 120 in a wireless network.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
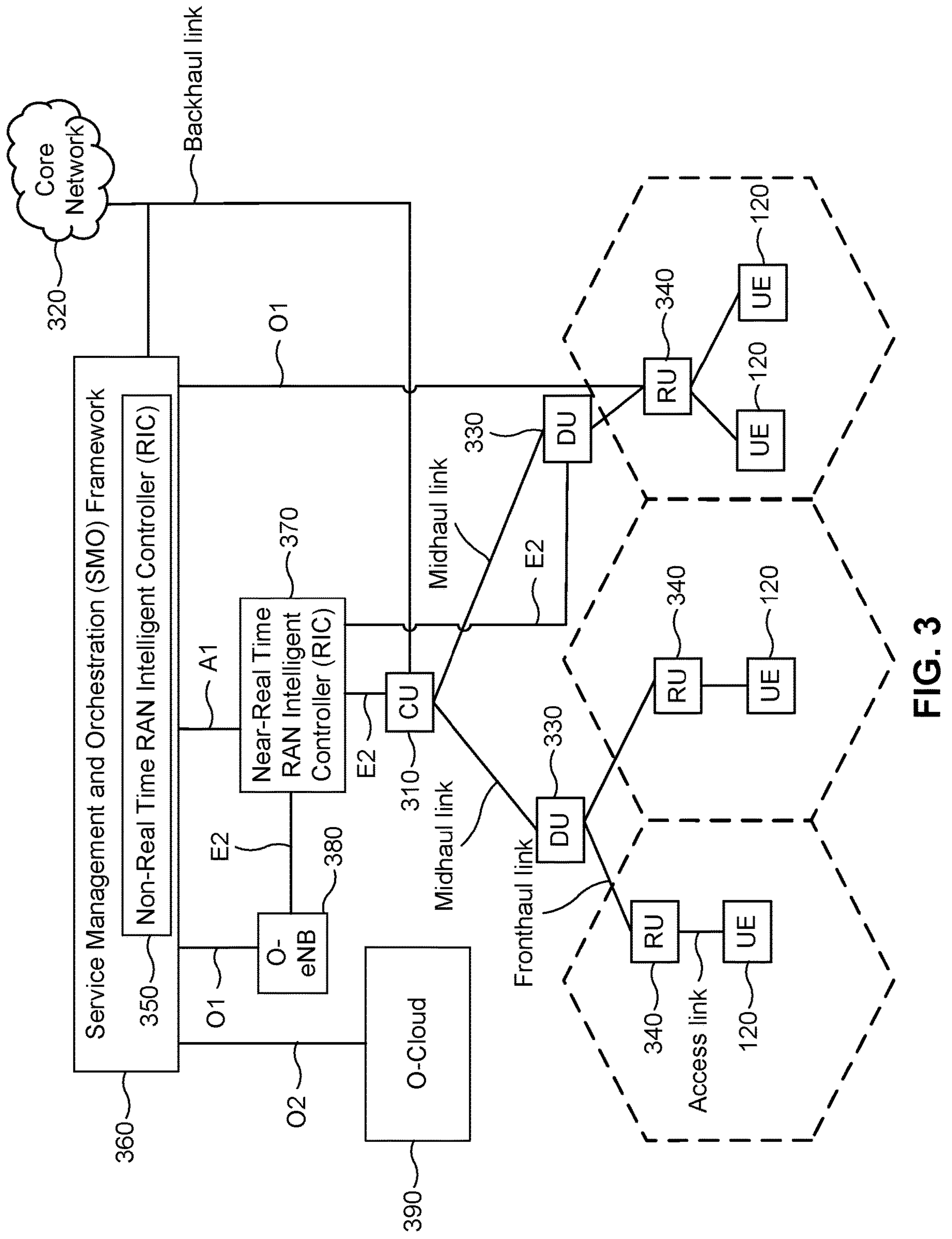
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with on-demand SSB patterns for SCell addition, as described in more detail elsewhere herein. For example, the controller/processor 240 of the network node 110, the controller/processor 280 of the UE 120, any other component(s) (or combinations of components) of FIG. 2, the CU 310, the DU 330, or the RU 340 may perform or direct operations of, for example, process 800 of FIG. 8, process 900 of FIG. 9, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 800 of FIG. 8, process 900 of FIG. 9, or other processes as described herein. In some examples, executing instructions may include running the instructions, converting the instructions, compiling the instructions, and/or interpreting the instructions, among other examples.

In some aspects, the UE 120 includes means for identifying a pattern for an on-demand SSB, wherein identifying the pattern is in association with a secondary cell activation; means for receiving the on-demand SSB in accordance with the pattern; and/or means for activating a secondary cell in accordance with the on-demand SSB. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for identifying a pattern for an on-demand SSB, wherein identifying the pattern is in association with a secondary cell activation; means for transmitting the on-demand SSB in accordance with the pattern; and/or means for activating a secondary cell in accordance with the on-demand SSB. The means for the network node 110 to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

Figure 4:
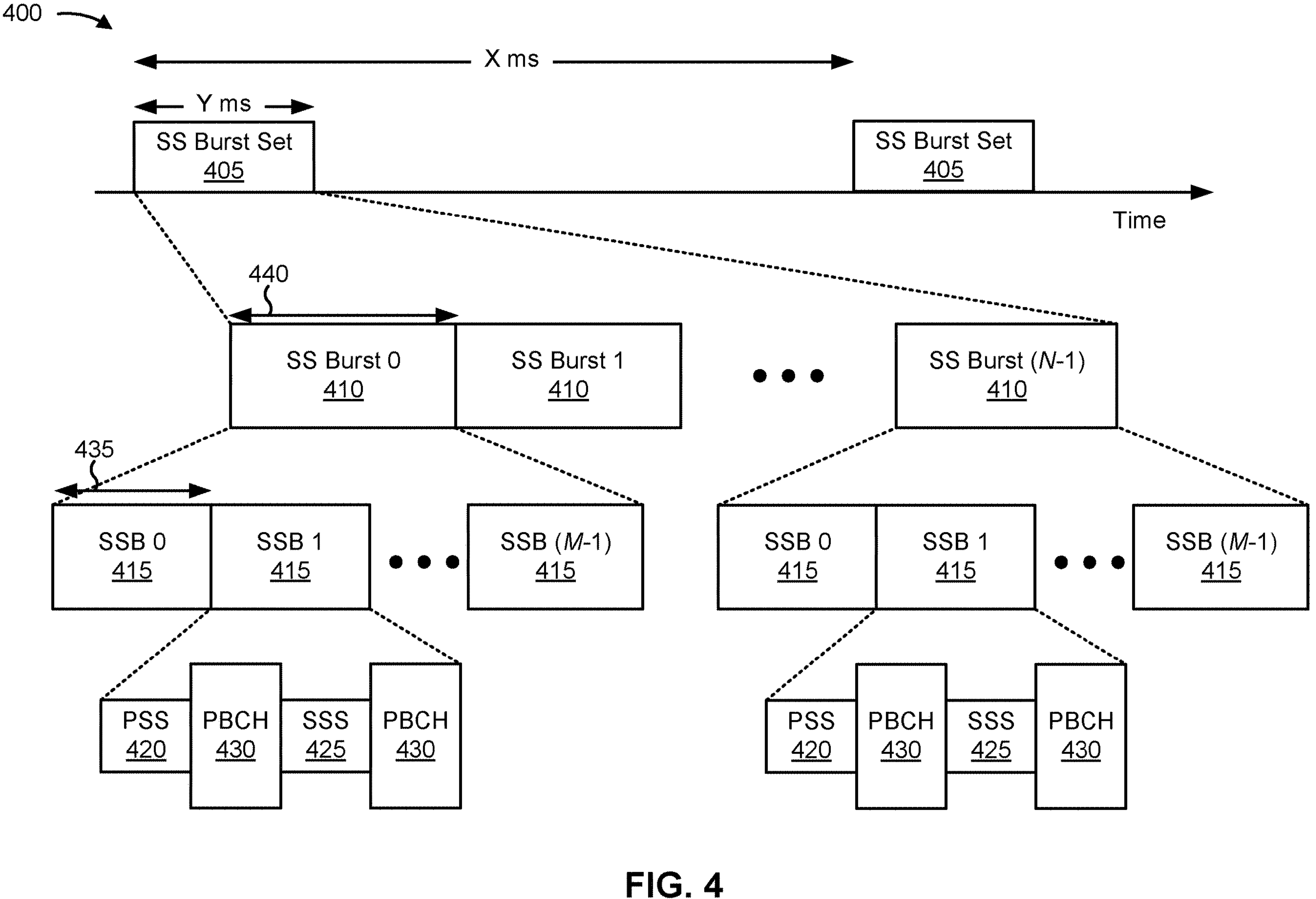
FIG. 4 is a diagram illustrating an example of a synchronization signal (SS) hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by one or more network nodes. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., a network node 110) according to a periodicity, such as every X milliseconds, as shown in FIG. 4. If on-demand SSBs are configured or transmitted, X may be selected from a set of periodicities including one or more larger periodicities such as 320 ms or 640 ms. If only SSBs 415 are configured or transmitted, X may be selected from a set of periodicities including up to 160 ms. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a primary synchronization signal (PSS) 420, a secondary synchronization signal (SSS) 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period 435, and the SSBs 415 of the SS burst 410 may be transmitted by a wireless node (e.g., a network node 110) according to the burst period 435. In this case, the SSBs 415 may be repeated during each SS burst 410. In some aspects, the SS burst set 405 may have a burst set periodicity 440, whereby the SS bursts 410 of the SS burst set 405 are transmitted by the wireless node according to the fixed burst set periodicity 440. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., a reference signal received power (RSRP) parameter) to a network node 110 (e.g., directly or via one or more other network nodes). The network node 110 and the UE 120 may use the one or more indicated SSBs 415 to select one or more beams to be used for communication between the network node 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell). For example, the UE 120 may use the SSB 415 to perform time/frequency synchronization or L1/L3 measurement, or to receive activation signaling, for a secondary cell (SCell) activation.

An SSB 415 may be referred to herein as a periodic SSB, since SSBs 415 may be transmitted according to a fixed periodicity (shown as "X"). Another form of SSB is an on-demand (OD) SSB. An OD-SSB may be transmitted in an SS burst, and may not be associated with a fixed burst set periodicity. For example, an OD-SSB may be triggered (such as via UE wake-up signaling, a cell on/off indication, or SCell activation or deactivation signaling). An OD-SSB may be transmitted according to a pattern (which may indicate times at which one or more OD-SSBs are transmitted), and may not recur after transmission of the OD-SSB is complete. Aspects described herein provide signaling of a pattern for an OD-SSB associated with SCell activation.

As indicated above, FIG. 4 is provided as an example. Other examples may differ from what is described with regard to FIG. 4.

Figure 5:
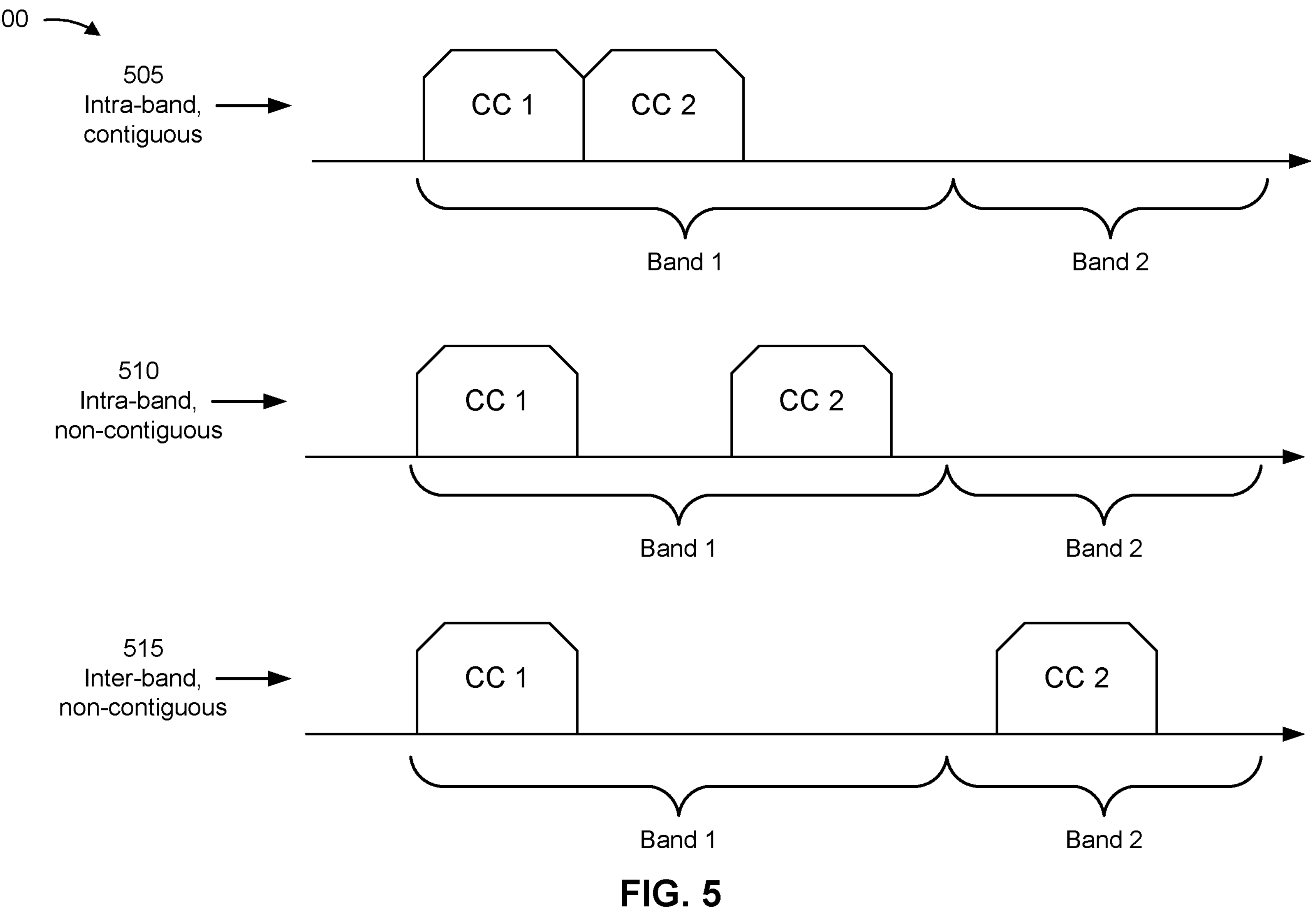
FIG. 5 is a diagram illustrating examples of carrier aggregation, in accordance with the present disclosure.

FIG. 5 is a diagram illustrating examples 500 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in a RRC message, DCI, and/or another signaling message.

As shown by reference number 505, in some aspects, carrier aggregation may be configured in an intra-band contiguous mode where the aggregated carriers are contiguous to one another and are in the same band. As shown by reference number 510, in some aspects, carrier aggregation may be configured in an intra-band non-contiguous mode where the aggregated carriers are non-contiguous to one another and are in the same band. As shown by reference number 515, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

An SCell may be activated according to an SCell activation command. In some aspects, the UE 120 may synchronize with the SCell using SSBs, such as SSBs 415. As another example, the UE 120 may synchronize with the SCell using on-demand SSBs, such as according to a pattern for the on-demand SSBs, as described in connection with FIGS. 6 and 7.

As indicated above, FIG. 5 is provided as an example. Other examples may differ from what is described with regard to FIG. 5.

Figure 6:
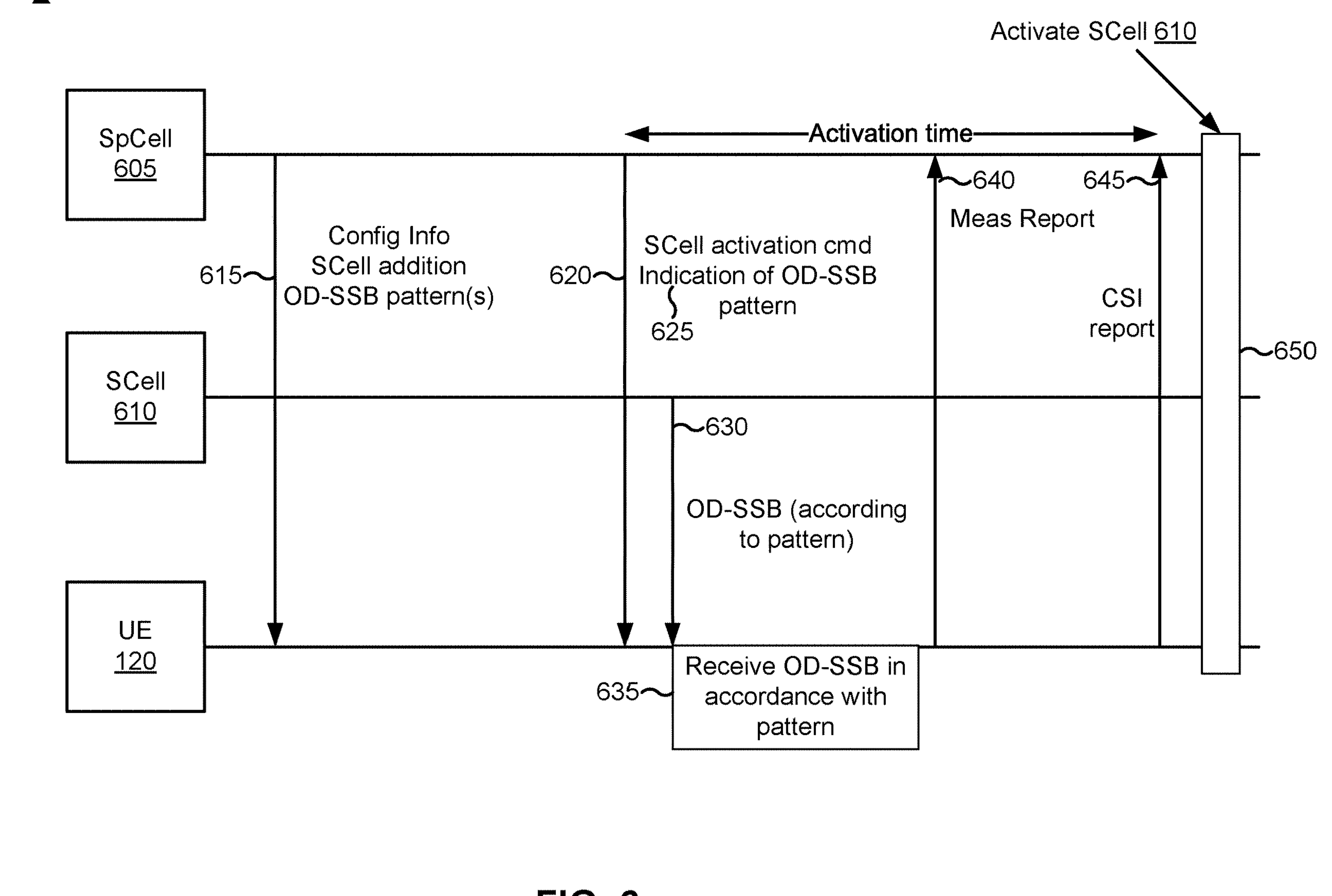
FIG. 6 is a diagram illustrating an example of signaling associated with on-demand (OD) synchronization signal block (SSB) transmission for secondary cell (SCell) activation, in accordance with the present disclosure.

FIG. 6 is a diagram illustrating an example 600 of signaling associated with OD-SSB transmission for SCell activation, in accordance with the present disclosure. Example 600 includes a UE 120, a special cell (SpCell) 605, and an SCell 610. An SpCell is a cell on which control signaling can be transmitted, and may include a PCell or a primary secondary cell (PSCell). A PSCell is a cell for which initial access is initiated for a secondary cell group (SCG). A PCell may include a cell for which initial access is initiated for a master or main cell group (MCG). The SpCell 605 may be provided by a network node 110. The SCell 610 may be provided by a network node 110. In example 600, the SpCell 605 transmits, and the UE 120 receives, an indication of a pattern for an OD-SSB. This can be contrasted with FIG. 7 in which the UE 120 transmits, and an SpCell 705 receives, the indication of the pattern.

As shown, the UE 120 may receive (e.g., from the SpCell 605) configuration information 615. For example, the UE 120 may receive the configuration information 615 via RRC signaling such as an RRC reconfiguration message. As shown, the configuration information 615 may indicate an SCell addition. For example, the configuration information 615 may include a parameter indicating one or more SCells that can be added (e.g., activated) for the UE 120.

As further shown, the configuration information 615 may indicate one or more patterns for an OD-SSB. A pattern for an OD-SSB may indicate one or more parameters relating to transmission of the OD-SSB. For example, the pattern may indicate a number of OD-SSB bursts (which may each include one or more OD-SSBs) to be transmitted when the OD-SSB is triggered. As another example, the pattern may indicate a time gap between a first OD-SSB burst and a second OD-SSB burst (e.g., gaps between OD-SSB bursts). As another example, the pattern may indicate a time gap between a first OD-SSB of an OD-SSB burst and a second OD-SSB of the OD-SSB burst. As another example, the pattern may indicate a starting offset for an OD-SSB. For example, the pattern may indicate an offset (such as relative to a triggering signal or other trigger for the OD-SSB) that identifies a time at which the OD-SSB or the OD-SSB burst is transmitted. References herein to transmitting an OD-SSB should be understood to include transmitting an OD-SSB burst or set of OD-SSB bursts to which the OD-SSB belongs. In some aspects, the configuration information 615 may indicate a plurality of patterns, such that a subsequent signal can indicate a selected pattern of the plurality of patterns, thereby reducing overhead associated with indicating a pattern for an OD-SSB.

As shown, the SpCell 605 may transmit, and the UE 120 may receive, an SCell activation command 620. The SCell activation command 620 may indicate an SCell 610 to be activated, such as in accordance with the configuration information 615. As shown, the SCell activation command 620 may include an indication 625 of a pattern for an OD-SSB 630. In some aspects, the UE 120 may receive the indication 625 separately from the SCell activation command 620. Transmitting (at the SpCell 605) and receiving (at the UE 120) the indication 625 of the pattern may be referred to as identifying the pattern.

The indication 625 may indicate a pattern for an OD-SSB 630. For example, the OD-SSB 630 (or one or more OD-SSB bursts including the OD-SSB 630, as mentioned) may be transmitted by the SCell 610 in accordance with parameters of the indicated pattern. For example, the OD-SSB 630 may be transmitted using a time gap, starting offset, and/or number of OD-SSB bursts indicated by the pattern.

As shown by reference number 635, the UE 120 may receive the OD-SSB 630 in accordance with the indicated pattern. For example, the UE 120 may receive the OD-SSB 630 according to a time gap, starting offset, and/or number of OD-SSB bursts indicated by the pattern. In some aspects, receiving an OD-SSB may include receiving the OD-SSB transmission as a trigger to activate the SCell 610 (e.g., the OD-SSB 630 may be or may be associated with the SCell activation command 620), performing automatic gain control (AGC) using the OD-SSB 630, performing synchronization using the OD-SSB 630, performing an L1 and/or L3 measurement using the OD-SSB 630, or a combination thereof.

As shown by reference number 640, in some aspects, the UE 120 may transmit a measurement report regarding the OD-SSB 630. For example, the measurement report may indicate one or more L1 and/or L3 measurements performed on the SCell 610 using the OD-SSB 630, such as to facilitate beam selection on the SCell 610 or selection of an appropriate SCell 610. In example 600, the measurement report is transmitted after the UE 120 receives the SCell activation command 620. In some other aspects described herein, the UE 120 may transmit the measurement report prior to receiving an SCell activation command, such as in FIG. 7.

As shown, in some aspects, the UE 120 may transmit a CSI report 645 regarding the SCell 610. For example, the CSI report 645 may include CSI derived from the OD-SSB 630. As shown by reference number 650, the UE 120 and the SpCell 605 (or the SCell 610) may activate the SCell 610. For example, the UE 120 may communicate on the SCell 610, such as after transmitting the CSI report 645.

Thus, a network node (e.g., the SpCell 605) may signal a pattern-based OD-SSB configuration to the UE 120, and may activate an OD-SSB 630 upon an SCell activation command 620.

As indicated above, FIG. 6 is provided as an example. Other examples may differ from what is described with regard to FIG. 6.

Figure 7:
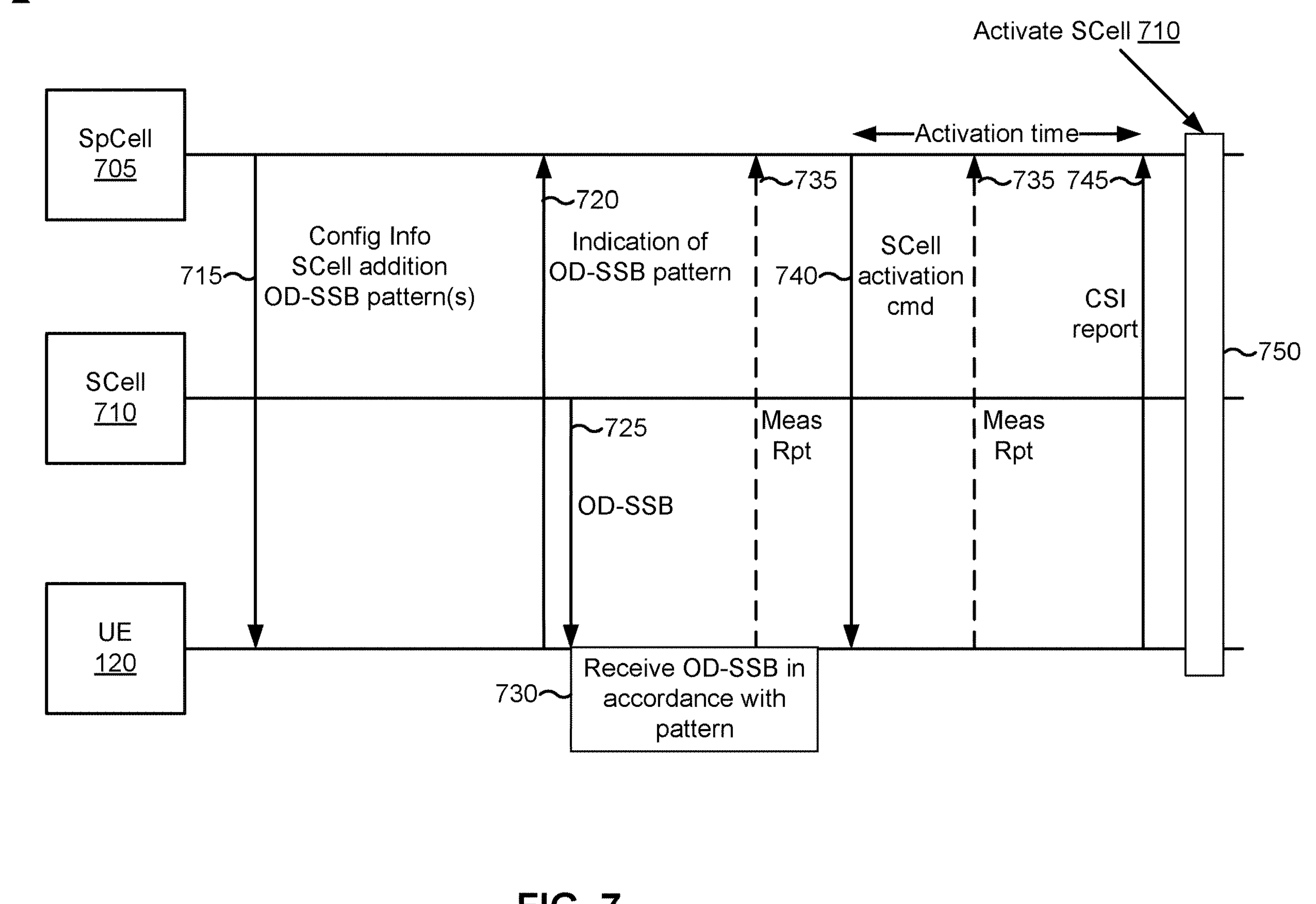
FIG. 7 is a diagram illustrating an example of signaling associated with OD-SSB transmission for SCell activation, in accordance with the present disclosure.

FIG. 7 is a diagram illustrating an example 700 of signaling associated with OD-SSB transmission for SCell activation, in accordance with the present disclosure. Example 700 includes a UE 120, an SpCell 705, and an SCell 710. The SpCell 705 may be provided by a network node 110. The SCell 710 may be provided by a network node 110. In example 700, the UE 120 transmits, and the SpCell 705 receives, an indication of a pattern for an OD-SSB. This can be contrasted with FIG. 6, in which the SpCell 605 transmits, and the UE 120 receives, the indication of the pattern.

As shown, the UE 120 may receive (e.g., from the SpCell 705) configuration information 715. For example, the UE 120 may receive the configuration information 715 via RRC signaling such as an RRC reconfiguration message. As shown, the configuration information 715 may indicate an SCell addition. For example, the configuration information 715 may include a parameter indicating one or more SCells that can be added (e.g., activated) for the UE 120.

As further shown, the configuration information 715 may indicate one or more patterns for an OD-SSB. A pattern for an OD-SSB may indicate one or more parameters relating to transmission of the OD-SSB. For example, the pattern may indicate a number of OD-SSB bursts (which may each include one or more OD-SSBs) to be transmitted when the OD-SSB is triggered. As another example, the pattern may indicate a time gap between a first OD-SSB burst and a second OD-SSB burst (e.g., gaps between OD-SSB bursts). As another example, the pattern may indicate a time gap between a first OD-SSB of an OD-SSB burst and a second OD-SSB of the OD-SSB burst. As another example, the pattern may indicate a starting offset for an OD-SSB. For example, the pattern may indicate an offset (such as relative to a triggering signal or other trigger for the OD-SSB) that identifies a time at which the OD-SSB or the OD-SSB burst is transmitted. References herein to transmitting an OD-SSB should be understood to include transmitting an OD-SSB burst or set of OD-SSB bursts to which the OD-SSB belongs. In some aspects, the configuration information 715 may indicate a plurality of patterns, such that a subsequent signal can indicate a selected pattern of the plurality of patterns, thereby reducing overhead associated with indicating a pattern for an OD-SSB.

As shown, the UE 120 may transmit, and the SpCell 705 may receive, an indication 720 of a pattern for an OD-SSB 725. For example, the UE 120 may select the pattern in accordance with the configuration information 715 (e.g., the UE 120 may select the pattern from the one or more patterns indicated by the configuration information 715). In some aspects, the UE 120 may transmit the indication 720 prior to receiving an SCell activation command 740. The indication 720 may indicate a pattern for an OD-SSB 725. For example, the OD-SSB 725 (or one or more OD-SSB bursts including the OD-SSB 725, as mentioned) may be transmitted by the SCell 710 in accordance with parameters of the indicated pattern. For example, the OD-SSB 725 may be transmitted using a time gap, starting offset, and/or number of OD-SSB bursts indicated by the pattern. Receiving (at the SpCell 705) and transmitting (at the UE 120) the indication 720 of the pattern may be referred to as identifying the pattern.

As shown by reference number 730, the UE 120 may receive the OD-SSB 725 in accordance with the indicated pattern. For example, the UE 120 may receive the OD-SSB 725 according to a time gap, starting offset, and/or number of OD-SSB bursts indicated by the pattern. In some aspects, receiving an OD-SSB may include receiving the OD-SSB transmission as a trigger to activate the SCell 710 (e.g., the OD-SSB 725 may be or may be associated with the SCell activation command 740), performing synchronization using the OD-SSB 725, performing an L1 and/or L3 measurement using the OD-SSB 725, or a combination thereof. As further shown, in example 700, the UE 120 may receive the OD-SSB 725 prior to the SCell activation command 740, which may reduce time delay associated with activating the SCell 710, relative to measuring an OD-SSB after the SCell activation command is received.

As shown by reference number 735, in some aspects, the UE 120 may transmit a measurement report regarding the OD-SSB 725. Two instances of the measurement report are illustrated in FIG. 7 with dashed lines, indicating that in some aspects only one of the two instances of the measurement report may be transmitted. In some aspects, the UE 120 may transmit the measurement report prior to receiving the SCell activation command 740. In some other aspects, the UE 120 may transmit the measurement report after receiving the SCell activation command 740. In some aspects, the measurement report may indicate one or more L1 and/or L3 measurements performed on the SCell 710 using the OD-SSB 725, such as to facilitate beam selection on the SCell 710 or selection of an appropriate SCell 710.

As shown, the SpCell 705 may transmit, and the UE 120 may receive, an SCell activation command 740. The SCell activation command 740 may indicate an SCell 710 to be activated, such as in accordance with the configuration information 715, as described above. In some aspects, the SCell activation command 740 may be based at least in part on a measurement report as shown by reference number 735. For example, if the UE 120 transmits the measurement report prior to receiving the SCell activation command 740, then the SCell activation command 740 may be based at least in part on the measurement report (e.g., may indicate a beam or SCell that is selected in accordance with a measurement indicated by the measurement report).

As shown, in some aspects, the UE 120 may transmit a CSI report 745 regarding the SCell 710. For example, the CSI report 745 may include CSI derived from the OD-SSB 725. As shown by reference number 750, the UE 120 and the SpCell 705 (or the SCell 710) may activate the SCell 710. For example, the UE 120 may communicate on the SCell 710, such as after transmitting the CSI report 745.

As indicated above, FIG. 7 is provided as an example. Other examples may differ from what is described with regard to FIG. 7.

Figure 8:
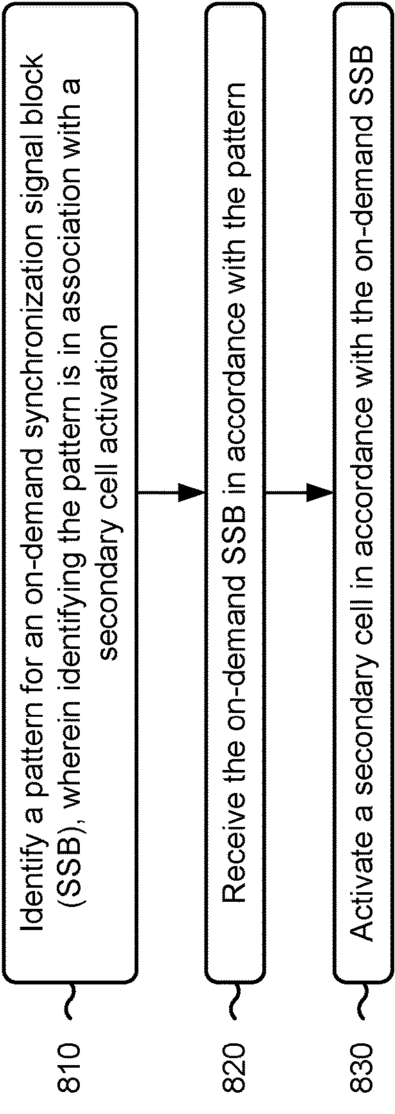
FIG. 8 is a diagram illustrating an example process performed, for example, at a UE or an apparatus of a UE, in accordance with the present disclosure.

FIG. 8 is a diagram illustrating an example process 800 performed, for example, at a UE or an apparatus of a UE, in accordance with the present disclosure. Example process 800 is an example where the apparatus or the UE (e.g., UE 120) performs operations associated with OD-SSB configuration and triggering for SCell activation.

As shown in FIG. 8, in some aspects, process 800 may include identifying a pattern for an on-demand SSB, wherein identifying the pattern is in association with a secondary cell activation (block 810). For example, the UE (e.g., using communication manager 1006, depicted in FIG. 10) may identify a pattern for an on-demand SSB. In some aspects, identifying the pattern is in association with a secondary cell activation. For example, identifying the pattern may be a step in a process for activating the secondary cell, or the UE may identify the pattern after or upon receiving an SCell activation command. In some aspects, the pattern is associated with an SCell activation. For example, configuration information indicating the pattern may indicate an association with SCell activation, or an indication of the pattern may include information indicating that the indication is associated with SCell activation.

As further shown in FIG. 8, in some aspects, process 800 may include receiving the on-demand SSB in accordance with the pattern (block 820). For example, the UE (e.g., using reception component 1002 and/or communication manager 1006, depicted in FIG. 10) may receive the on-demand SSB in accordance with the pattern, as described above.

As further shown in FIG. 8, in some aspects, process 800 may include activating a secondary cell in accordance with the on-demand SSB (block 830). For example, the UE (e.g., using communication manager 1006, depicted in FIG. 10) may activate a secondary cell in accordance with the on-demand SSB, as described above.

Process 800 may include additional aspects, such as any single aspect or any combination of aspects described below and/or in connection with one or more other processes described elsewhere herein.

In a first aspect, the pattern for the on-demand SSB indicates at least one of a number of bursts of the on-demand SSB, a gap associated with the number of bursts, or a starting offset for the on-demand SSB.

In a second aspect, alone or in combination with the first aspect, process 800 includes receiving configuration information indicating one or more patterns, wherein the pattern is one of the one or more patterns.

In a third aspect, alone or in combination with one or more of the first and second aspects, identifying the pattern further comprises receiving an indication of the pattern.

In a fourth aspect, alone or in combination with one or more of the first through third aspects, receiving the indication of the pattern further comprises receiving a secondary cell activation command indicating the pattern.

In a fifth aspect, alone or in combination with one or more of the first through fourth aspects, receiving the on-demand SSB further comprises receiving the on-demand SSB after the secondary cell activation command.

In a sixth aspect, alone or in combination with one or more of the first through fifth aspects, process 800 includes transmitting a measurement report regarding the on-demand SSB.

In a seventh aspect, alone or in combination with one or more of the first through sixth aspects, transmitting the measurement report further comprises transmitting the measurement report prior to receiving a secondary cell activation command associated with activating the secondary cell.

In an eighth aspect, alone or in combination with one or more of the first through seventh aspects, transmitting the measurement report further comprises transmitting the measurement report after receiving a secondary cell activation command associated with activating the secondary cell.

In a ninth aspect, alone or in combination with one or more of the first through eighth aspects, identifying the pattern further comprises transmitting an indication of the pattern.

In a tenth aspect, alone or in combination with one or more of the first through ninth aspects, transmitting the indication of the pattern further comprises transmitting the indication of the pattern prior to receiving a secondary cell activation command associated with activating the secondary cell.

In an eleventh aspect, alone or in combination with one or more of the first through tenth aspects, receiving the on-demand SSB further comprises receiving the on-demand SSB prior to a secondary cell activation command associated with activating the secondary cell.

In a twelfth aspect, alone or in combination with one or more of the first through eleventh aspects, receiving the on-demand SSB further comprises receiving the on-demand SSB as a trigger to activate the secondary cell.

In a thirteenth aspect, alone or in combination with one or more of the first through twelfth aspects, receiving the on-demand SSB further comprises performing synchronization using the on-demand SSB.

In a fourteenth aspect, alone or in combination with one or more of the first through thirteenth aspects, receiving the on-demand SSB further comprises performing a Layer 1 or Layer 3 measurement using the on-demand SSB.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
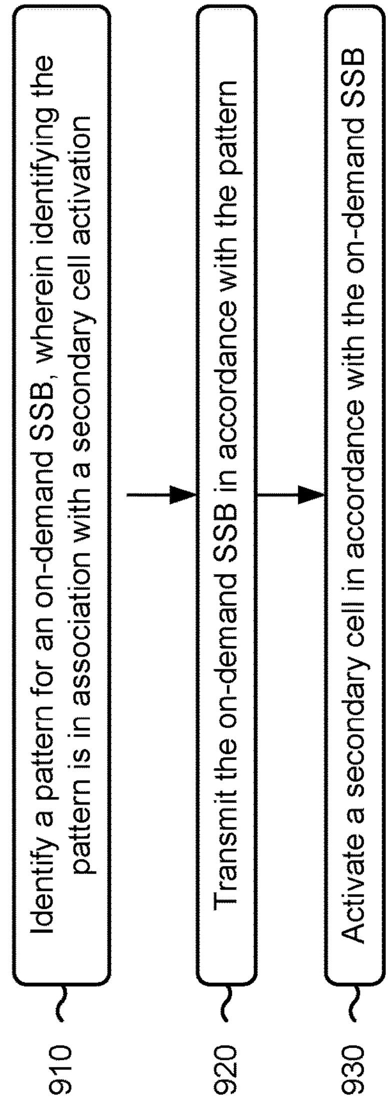
FIG. 9 is a diagram illustrating an example process performed, for example, at a network node or an apparatus of a network node, in accordance with the present disclosure.

FIG. 9 is a diagram illustrating an example process 900 performed, for example, at a network node or an apparatus of a network node, in accordance with the present disclosure. Example process 900 is an example where the apparatus or the network node (e.g., network node 110) performs operations associated with OD-SSB configuration and triggering for SCell activation.

As shown in FIG. 9, in some aspects, process 900 may include identifying a pattern for an on-demand SSB, wherein identifying the pattern is in association with a secondary cell activation (block 910). For example, the network node (e.g., using communication manager 1106, depicted in FIG. 11) may identify a pattern for an on-demand SSB. In some aspects, identifying the pattern is in association with a secondary cell activation. In some aspects, the pattern is associated with a secondary cell activation.

As further shown in FIG. 9, in some aspects, process 900 may include transmitting the on-demand SSB in accordance with the pattern (block 920). For example, the network node (e.g., using transmission component 1104 and/or communication manager 1106, depicted in FIG. 11) may transmit the on-demand SSB in accordance with the pattern, as described above.

As further shown in FIG. 9, in some aspects, process 900 may include activating a secondary cell in accordance with the on-demand SSB (block 930). For example, the network node (e.g., using communication manager 1106, depicted in FIG. 11) may activate a secondary cell in accordance with the on-demand SSB, as described above.

Process 900 may include additional aspects, such as any single aspect or any combination of aspects described below and/or in connection with one or more other processes described elsewhere herein.

In a first aspect, the pattern for the on-demand SSB indicates at least one of a number of bursts of the on-demand SSB, a gap associated with the number of bursts, or a starting offset for the on-demand SSB.

In a second aspect, alone or in combination with the first aspect, process 900 includes transmitting configuration information indicating one or more patterns, wherein the pattern is one of the one or more patterns.

In a third aspect, alone or in combination with one or more of the first and second aspects, identifying the pattern further comprises transmitting an indication of the pattern.

In a fourth aspect, alone or in combination with one or more of the first through third aspects, transmitting the indication of the pattern further comprises transmitting a secondary cell activation command indicating the pattern.

In a fifth aspect, alone or in combination with one or more of the first through fourth aspects, transmitting the on-demand SSB further comprises transmitting the on-demand SSB after the secondary cell activation command.

In a sixth aspect, alone or in combination with one or more of the first through fifth aspects, process 900 includes receiving a measurement report regarding the on-demand SSB.

In a seventh aspect, alone or in combination with one or more of the first through sixth aspects, receiving the measurement report further comprises receiving the measurement report prior to transmitting a secondary cell activation command associated with activating the secondary cell.

In an eighth aspect, alone or in combination with one or more of the first through seventh aspects, receiving the measurement report further comprises receiving the measurement report after transmitting a secondary cell activation command associated with activating the secondary cell.

In a ninth aspect, alone or in combination with one or more of the first through eighth aspects, identifying the pattern further comprises receiving an indication of the pattern.

In a tenth aspect, alone or in combination with one or more of the first through ninth aspects, receiving the indication of the pattern further comprises receiving the indication of the pattern prior to transmitting a secondary cell activation command associated with activating the secondary cell.

In an eleventh aspect, alone or in combination with one or more of the first through tenth aspects, transmitting the on-demand SSB further comprises transmitting the on-demand SSB prior to a secondary cell activation command associated with activating the secondary cell.

In a twelfth aspect, alone or in combination with one or more of the first through eleventh aspects, transmitting the on-demand SSB further comprises transmitting the on-demand SSB as a trigger to activate the secondary cell.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
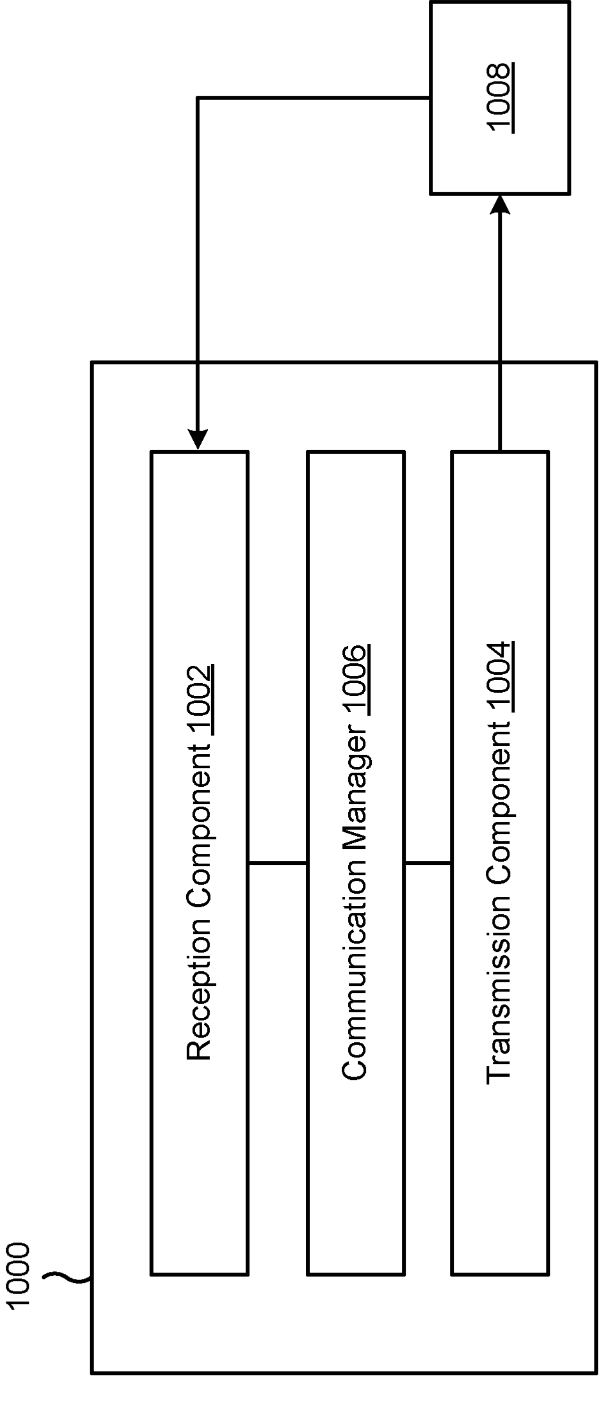
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may identify a pattern for an on-demand SSB, wherein identifying the pattern is in association with a secondary cell activation. The reception component 1002 may receive the on-demand SSB in accordance with the pattern. The communication manager 1006 may activate a secondary cell in accordance with the on-demand SSB.

The reception component 1002 may receive configuration information indicating one or more patterns, wherein the pattern is one of the one or more patterns.

The transmission component 1004 may transmit a measurement report regarding the on-demand SSB.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
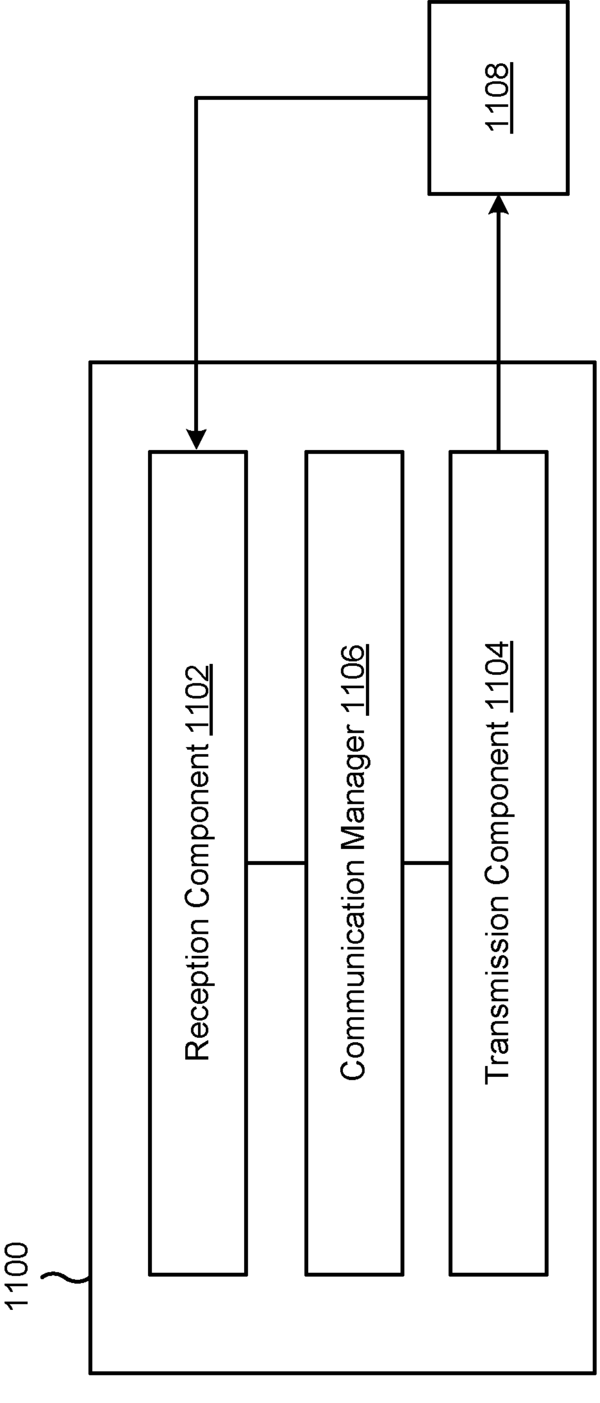
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may identify a pattern for an on-demand SSB, wherein identifying the pattern is in association with a secondary cell activation. The transmission component 1104 may transmit the on-demand SSB in accordance with the pattern. The communication manager 1106 may activate a secondary cell in accordance with the on-demand SSB.

The transmission component 1104 may transmit configuration information indicating one or more patterns, wherein the pattern is one of the one or more patterns.

The reception component 1102 may receive a measurement report regarding the on-demand SSB.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: identifying a pattern for an on-demand synchronization signal block (SSB), wherein identifying the pattern is in association with a secondary cell activation; receiving the on-demand SSB in accordance with the pattern; and activating a secondary cell in accordance with the on-demand SSB.

Aspect 2: The method of Aspect 1, wherein the pattern for the on-demand SSB indicates at least one of: a number of bursts of the on-demand SSB, a gap associated with the number of bursts, or a starting offset for the on-demand SSB.

Aspect 3: The method of any of Aspects 1-2, further comprising receiving configuration information indicating one or more patterns, wherein the pattern is one of the one or more patterns.

Aspect 4: The method of any of Aspects 1-3, wherein identifying the pattern further comprises receiving an indication of the pattern.

Aspect 5: The method of Aspect 4, wherein receiving the indication of the pattern further comprises receiving a secondary cell activation command indicating the pattern.

Aspect 6: The method of Aspect 5, wherein receiving the on-demand SSB further comprises receiving the on-demand SSB after the secondary cell activation command.

Aspect 7: The method of any of Aspects 1-6, further comprising transmitting a measurement report regarding the on-demand SSB.

Aspect 8: The method of Aspect 7, wherein transmitting the measurement report further comprises transmitting the measurement report prior to receiving a secondary cell activation command associated with activating the secondary cell.

Aspect 9: The method of Aspect 7, wherein transmitting the measurement report further comprises transmitting the measurement report after receiving a secondary cell activation command associated with activating the secondary cell.

Aspect 10: The method of any of Aspects 1-9, wherein identifying the pattern further comprises transmitting an indication of the pattern.

Aspect 11: The method of Aspect 10, wherein transmitting the indication of the pattern further comprises transmitting the indication of the pattern prior to receiving a secondary cell activation command associated with activating the secondary cell.

Aspect 12: The method of Aspect 11, wherein receiving the on-demand SSB further comprises receiving the on-demand SSB prior to a secondary cell activation command associated with activating the secondary cell.

Aspect 13: The method of any of Aspects 1-12, wherein receiving the on-demand SSB further comprises receiving the on-demand SSB as a trigger to activate the secondary cell.

Aspect 14: The method of any of Aspects 1-13, wherein receiving the on-demand SSB further comprises performing synchronization using the on-demand SSB.

Aspect 15: The method of any of Aspects 1-14, wherein receiving the on-demand SSB further comprises performing a Layer 1 or Layer 3 measurement using the on-demand SSB.

Aspect 16: A method of wireless communication performed by a network node, comprising: identifying a pattern for an on-demand synchronization signal block (SSB), wherein identifying the pattern is in association with a secondary cell activation; transmitting the on-demand SSB in accordance with the pattern; and activating a secondary cell in accordance with the on-demand SSB.

Aspect 17: The method of Aspect 16, wherein the pattern for the on-demand SSB indicates at least one of: a number of bursts of the on-demand SSB, a gap associated with the number of bursts, or a starting offset for the on-demand SSB.

Aspect 18: The method of any of Aspects 16-17, further comprising transmitting configuration information indicating one or more patterns, wherein the pattern is one of the one or more patterns.

Aspect 19: The method of any of Aspects 16-18, wherein identifying the pattern further comprises transmitting an indication of the pattern.

Aspect 20: The method of Aspect 19, wherein transmitting the indication of the pattern further comprises transmitting a secondary cell activation command indicating the pattern.

Aspect 21: The method of Aspect 20, wherein transmitting the on-demand SSB further comprises transmitting the on-demand SSB after the secondary cell activation command.

Aspect 22: The method of any of Aspects 16-21, further comprising receiving a measurement report regarding the on-demand SSB.

Aspect 23: The method of Aspect 22, wherein receiving the measurement report further comprises receiving the measurement report prior to transmitting a secondary cell activation command associated with activating the secondary cell.

Aspect 24: The method of Aspect 22, wherein receiving the measurement report further comprises receiving the measurement report after transmitting a secondary cell activation command associated with activating the secondary cell.

Aspect 25: The method of any of Aspects 16-24, wherein identifying the pattern further comprises receiving an indication of the pattern.

Aspect 26: The method of Aspect 25, wherein receiving the indication of the pattern further comprises receiving the indication of the pattern prior to transmitting a secondary cell activation command associated with activating the secondary cell.

Aspect 27: The method of Aspect 26, wherein transmitting the on-demand SSB further comprises transmitting the on-demand SSB prior to a secondary cell activation command associated with activating the secondary cell.

Aspect 28: The method of any of Aspects 16-27, wherein transmitting the on-demand SSB further comprises transmitting the on-demand SSB as a trigger to activate the secondary cell.

Aspect 29: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-28.

Aspect 30: An apparatus for wireless communication at a device, the apparatus comprising one or more memories and one or more processors coupled to the one or more memories, the one or more processors configured to cause the device to perform the method of one or more of Aspects 1-28.

Aspect 31: An apparatus for wireless communication, the apparatus comprising at least one means for performing the method of one or more of Aspects 1-28.

Aspect 32: A non-transitory computer-readable medium storing code for wireless communication, the code comprising instructions executable by one or more processors to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

Aspect 34: A device for wireless communication, the device comprising a processing system that includes one or more processors and one or more memories coupled with the one or more processors, the processing system configured to cause the device to perform the method of one or more of Aspects 1-28.

Aspect 35: An apparatus for wireless communication at a device, the apparatus comprising one or more memories and one or more processors coupled to the one or more memories, the one or more processors individually or collectively configured to cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE), comprising:

one or more antennas; and a processing system that includes one or more processors and one or more memories that store code for the one or more processors, the processing system configured to cause the UE to:

identify a pattern, for an on-demand synchronization signal block (SSB), in association with a secondary cell activation;

receive the on-demand SSB in accordance with the pattern;

transmit a measurement report associated with the on-demand SSB, wherein transmission of the measurement report occurs either prior to reception of a secondary cell activation command associated with activation of a secondary cell or after reception of the secondary cell activation command associated with activation of the secondary cell; and activate the secondary cell in accordance with the on-demand SSB.

2. The UE of claim 1, wherein the pattern for the on-demand SSB indicates at least one of:

a number of bursts of the on-demand SSB, a gap associated with the number of bursts, or a starting offset for the on-demand SSB.

3. The UE of claim 1, wherein the processing system is further configured to cause the UE to receive configuration information indicating one or more patterns, wherein the pattern is one of the one or more patterns.

4. The UE of claim 1, wherein the processing system, to cause the UE to identify the pattern, is configured to cause the UE to receive an indication of the pattern.

5. The UE of claim 4, wherein the processing system, to cause the UE to receive the indication of the pattern, is configured to cause the UE to receive a secondary cell activation command indicating the pattern.

6. The UE of claim 5, wherein the processing system, to cause the UE to receive the on-demand SSB, is configured to cause the UE to receive the on-demand SSB after the secondary cell activation command.

7. The UE of claim 1, wherein the processing system, to cause the UE to identify the pattern, is configured to cause the UE to transmit an indication of the pattern.

8. The UE of claim 7, wherein the processing system, to cause the UE to transmit the indication of the pattern, is configured to cause the UE to transmit the indication of the pattern prior to receiving a secondary cell activation command associated with activating the secondary cell.

9. The UE of claim 8, wherein the processing system, to cause the UE to receive the on-demand SSB, is configured to cause the UE to receive the on-demand SSB prior to a secondary cell activation command associated with activating the secondary cell.

10. The UE of claim 1, wherein the processing system, to cause the UE to receive the on-demand SSB, is configured to cause the UE to receive the on-demand SSB as a trigger to activate the secondary cell.

11. The UE of claim 1, wherein the processing system, to cause the UE to receive the on-demand SSB, is configured to cause the UE to perform synchronization using the on-demand SSB.

12. The UE of claim 1, wherein the processing system, to cause the UE to receive the on-demand SSB, is configured to cause the UE to perform a Layer 1 (L1) or Layer 3 (L3) measurement using the on-demand SSB.

13. The UE of claim 1, wherein the processing system, to cause the UE to receive the on-demand SSB, is configured to cause the UE to perform automatic gain control using the on-demand SSB.

14. A network node, comprising:

one or more antennas; and a processing system that includes one or more processors and one or more memories that store code for the one or more processors, the processing system configured to cause the network node to:

identify a pattern, for an on-demand synchronization signal block (SSB), in association with a secondary cell activation;

transmit the on-demand SSB in accordance with the pattern;

receive a measurement report associated with the on-demand SSB, wherein reception of the measurement report occurs either prior to transmission of a secondary cell activation command associated with activation of a secondary cell or after transmission of the secondary cell activation command associated with activation of the secondary cell; and activate the secondary cell in accordance with the on-demand SSB.

15. The network node of claim 14, wherein the processing system is further configured to cause the network node to transmit configuration information indicating one or more patterns, wherein the pattern is one of the one or more patterns.

16. The network node of claim 14, wherein the processing system, to cause the network node to identify the pattern, is configured to cause the network node to receive an indication of the pattern.

17. A method of wireless communication performed by a user equipment (UE), comprising:

identifying a pattern, for an on-demand synchronization signal block (SSB), in association with a secondary cell activation;

receiving the on-demand SSB in accordance with the pattern;

transmitting a measurement report associated with the on-demand SSB, wherein transmission of the measurement report occurs either prior to receiving a secondary cell activation command associated with activating a secondary cell or after receiving the secondary cell activation command associated with activating the secondary cell; and activating the secondary cell in accordance with the on-demand SSB.

18. The UE of claim 1, wherein the measurement report indicates one or more Layer 1 (L1) or Layer 3 (L3) measurements performed on the secondary cell.

19. The method of claim 17, wherein the pattern for the on-demand SSB indicates at least one of:

a number of bursts of the on-demand SSB, a gap associated with the number of bursts, or a starting offset for the on-demand SSB.

20. The method of claim 17, wherein the measurement report indicates one or more Layer 1 (L1) or Layer 3 (L3) measurements performed on the secondary cell.

* * * * *